(No Model.)
A. H. HANDLAN, Jr.
LOCOMOTIVE HEAD LIGHT.
No. 281,869. Patented July 24, 1883.
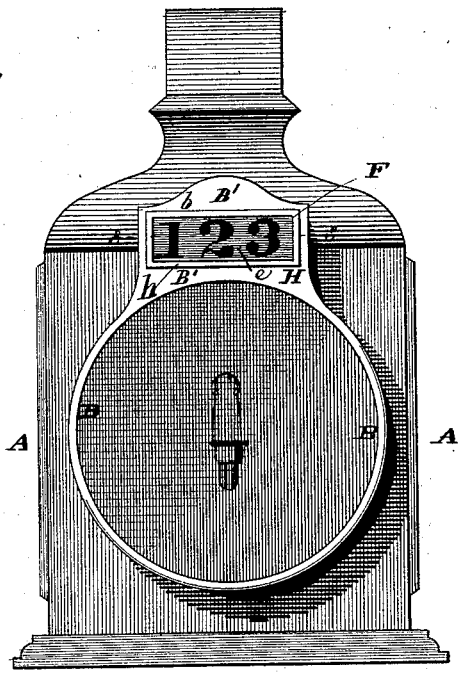
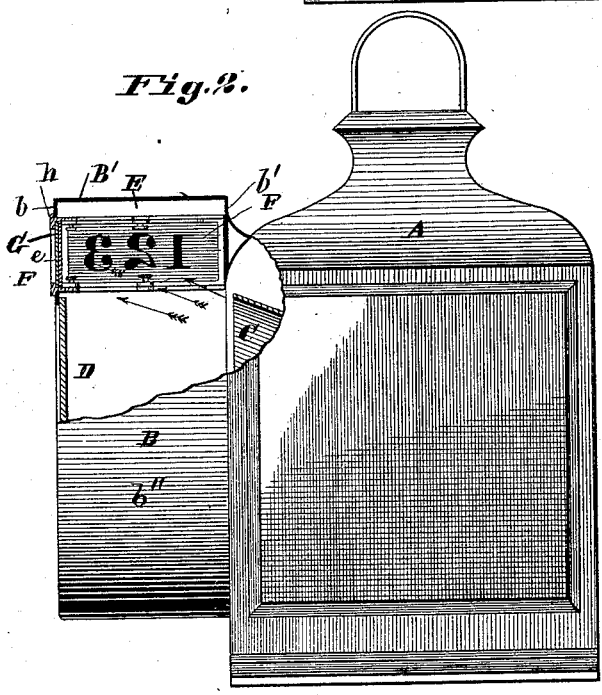
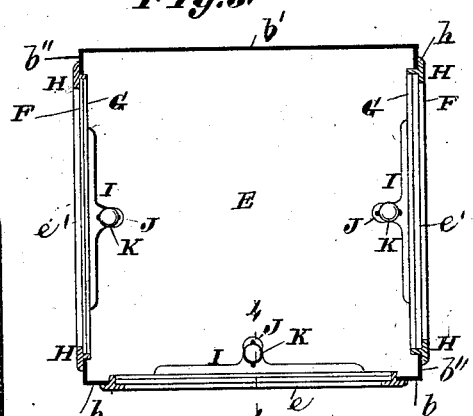
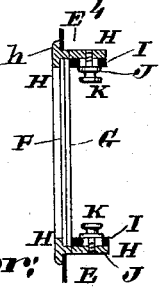
Attest:
Wm. F. Sayers
Chas. C. Buckley
Inventor:
A. H. Handlan Jr.
By Knight Bros
Attys

UNITED STATES PATENT OFFICE.

ALEXANDER H. HANDLAN, JR., OF ST. LOUIS, MISSOURI.

LOCOMOTIVE HEAD-LIGHT.

SPECIFICATION forming part of Letters Patent No. 281,869, dated July 24, 1883.

Application filed March 21, 1883. (No model.)

*To all whom it may concern:*

Be it known that I, ALEXANDER H. HANDLAN, Jr., of the city of St. Louis, in the State of Missouri, have invented new and useful Improvements in Locomotive Head-Lights, of which the following is a full, clear, and exact description.

My invention relates to a signal-chamber and to means for securing signal plates or glasses in position; and my improvements consist in certain details of construction, hereinafter described and pointed out in the claims, whereby a far more simple form of lantern with front and side signals is produced without changing the ordinary contour of the body of the lantern, as I form the signal-chamber within the rim, instead of putting it on the rim and body, or wholly in front of the rim, as heretofore.

In order that my invention may be fully understood, I will proceed to describe it with reference to the accompanying drawings, in which—

Figure 1 is a front view of a head-light embodying my invention. Fig. 2 is a side view thereof, a portion being removed. Fig. 3 is a horizontal section of the signal-chamber on the line 3 3, Fig. 1. Fig. 4 is a detail vertical section on the line 4 4, Fig. 3.

A represents the body, C the reflector, and D the semaphore, of a head-light, which may be of any approved construction.

B is the rim, having top extension, B', forming a signal-chamber, E, in front of the body, open at bottom. The rim is formed with front plate, *b*, rear plate, *b'*, and broad connecting-band *b''*, extending up and over the signal-chamber to obviate the necessity of cutting away the rim or body in rear of the signal-chamber, thus forming the signal-chamber in one with the chamber in rear of the semaphore. The signal-chamber E is rectangular in horizontal section, and is solid on the rear side, while the front and sides have openings for the reception of front signal, *e*, and side signals, *e' e'*. I place frames H, having flanges *h*, in said openings, to receive the signal-plates, which are held in the frames by means of clamp-plates I, removably and adjustably secured to the interior of the frames by set-screws K, passing through slots J in the plates and screwing into the frames, as shown more clearly in Figs. 3 and 4. As signal-plates, I prefer to use numbered glass plates F, and ground glass plates G behind them, and the outer glass would preferably be made black, except the lettered portion; but I do not confine myself to the use of two glasses or to the manner of preparing either one of them; nor do I claim any invention therein.

By my construction of rim signal-chamber I am enabled to provide a flattened broad signal-box, which can receive direct rays of light from the reflector being located within the rim, between the front and rear plates and contiguous to the reflector, without interfering with the ordinary circular semaphore, the signals being independent thereof, while at the same time they receive their light wholly through its chamber.

Having thus described my invention, the following is what I claim as new therein and desire to secure by Letters Patent:

1. A locomotive head-light provided with a rim having an upward extension at top and a signal-chamber within said extension, and front and side signal-plate openings into said chamber, the signal-chamber receiving its light wholly through the semaphore-chamber, as set forth.

2. In a locomotive head-light, the combination, with a body, A, and reflector C, of a broad rim, B, having extension B', formed by front plate, *b*, rear plate, *b'*, and broad connecting-band *b''*, extending over the signal-chamber, the signal-chamber being formed by said extension, and having front and side signal-plate openings, and receiving its light through the semaphore-chamber, as set forth.

3. A locomotive head-light having a rim with a broad flattened extension at top, providing a signal-chamber, E, within the rim, between the body of the lantern and the front plate of the rim, in close proximity to the reflector, and provided with front signal-plate and side signal-plates, illuminated by light passing through the semaphore-chamber, as set forth.

4. The combination, in a locomotive head-light, with the body having an extended rim, and the chamber within the rim, having front and side openings, and into which the light shines, of the frames located in the openings to receive the glasses having the signals thereon, and the removable adjustable plates holding the glasses in the frames, substantially as shown and described.

5. In combination with a head-light case having signal-opening, the frame H, having flanges $h$ on its outer rim, a signal-plate, and clamp-plates I, removably and adjustably secured to the frame, having slots J and set-screws K, as set forth.

ALEXANDER H. HANDLAN, Jr.

Witnesses:
SAML. KNIGHT,
GEO. H. KNIGHT.